(12) United States Patent
Kim et al.

(10) Patent No.: US 11,636,983 B2
(45) Date of Patent: *Apr. 25, 2023

(54) MANUFACTURING METHOD OF MULTILAYER CERAMIC ELECTRONIC COMPONENT

(71) Applicant: SAMSUNG ELECTRO-MECHANICS CO., LTD., Suwon-si (KR)

(72) Inventors: Tae Sung Kim, Suwon-si (KR); Hyeong Sik Yun, Suwon-si (KR); Woo Chul Shin, Suwon-si (KR); Joon Woon Lee, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/726,888

(22) Filed: Apr. 22, 2022

(65) Prior Publication Data

US 2022/0246359 A1 Aug. 4, 2022

Related U.S. Application Data

(62) Division of application No. 16/836,085, filed on Mar. 31, 2020, now Pat. No. 11,342,121.

(30) Foreign Application Priority Data

Aug. 2, 2019 (KR) .................. 10-2019-0094257

(51) Int. Cl.
*H01G 4/30* (2006.01)
*H01G 4/012* (2006.01)
*H01G 4/12* (2006.01)

(52) U.S. Cl.
CPC ............. *H01G 4/30* (2013.01); *H01G 4/012* (2013.01); *H01G 4/1218* (2013.01)

(58) Field of Classification Search
CPC ........... H01G 4/30; H01G 4/005; H01G 4/14; H01G 4/224; H01G 4/248; H01G 4/252; H01G 4/012
See application file for complete search history.

(56) References Cited

U.S. PATENT DOCUMENTS 6,930,876 B1    8/2005  Noguchi et al.
10,559,423 B2 * 2/2020  Koide ................ C04B 35/6264
(Continued)

FOREIGN PATENT DOCUMENTS

CN    1649049 A    8/2005
CN    1677588 A    10/2005
(Continued)

OTHER PUBLICATIONS

Office Action issued in Chinese Patent Application No. 202010690279.6 dated Sep. 27, 2021, with English translation.
(Continued)

*Primary Examiner* — David M Sinclair
*Assistant Examiner* — Daniel M Dubuisson
(74) *Attorney, Agent, or Firm* — Morgan, Lewis & Bockius LLP (57) ABSTRACT

The multilayer ceramic electronic component includes a ceramic body including a dielectric layer; and first and second internal electrodes disposed inside the ceramic body, and disposed to oppose each other with the dielectric layer interposed therebetween. When an average thickness of the dielectric layer is referred to as td and a standard deviation of a thickness of the dielectric layer in each position is referred to as σtd, while an average thickness of the first and second internal electrodes is referred to as to and a standard (Continued)

deviation of a thickness of a pre-determined region of any layer of the internal electrodes in each position is referred to as σte, a ratio (σte/σtd) of the standard deviation of the internal electrodes in each position to the standard deviation of the thickness of the dielectric layer in each position satisfies $1.10 \leq \sigma te/\sigma td \leq 1.35$.

8 Claims, 4 Drawing Sheets

(56) References Cited

U.S. PATENT DOCUMENTS

| | | |
|---|---|---|
| 2005/0219795 A1 | 10/2005 | Murosawa et al. |
| 2008/0068778 A1 | 3/2008 | Taniguchi et al. |
| 2013/0063862 A1 | 3/2013 | Kim et al. |
| 2013/0342956 A1 | 12/2013 | Konishi et al. |
| 2014/0022698 A1 | 1/2014 | Jeong et al. |
| 2018/0090273 A1 | 3/2018 | Hwang et al. |
| 2018/0240597 A1 | 8/2018 | Ahn et al. |
| 2019/0080848 A1 | 3/2019 | Mizuno et al. |
| 2019/0267189 A1* | 8/2019 | Makino ............ H01G 4/1227 |
| 2019/0385794 A1 | 12/2019 | Yanagisawa et al. |
| 2020/0335279 A1* | 10/2020 | Jiayin ............ H01G 4/008 |
| 2021/0035741 A1 | 2/2021 | Cho et al. |
| 2022/0204798 A1* | 6/2022 | Yoshida ............ C09D 11/52 |

FOREIGN PATENT DOCUMENTS

| | | |
|---|---|---|
| CN | 112309718 A | 2/2021 |
| EP | 1 583 114 A1 | 10/2005 |
| JP | 2003-178926 A | 6/2003 |
| JP | 2004-79994 A | 3/2004 |
| JP | 2006-128362 A | 5/2006 |
| JP | 2019-087568 A | 6/2019 |
| KR | 10-2006-0125277 A | 12/2006 |

OTHER PUBLICATIONS

U.S. Notice of Allowance dated Apr. 6, 2022, issued in corresponding U.S. Appl. No. 16/836,085.
U.S. Office Action dated Sep. 30, 2022, issued in corresponding U.S. Appl. No. 17/726,885.
U.S. Office Action dated Feb. 24, 2023, issued in corresponding U.S. Appl. No. 17/726,885.

* cited by examiner

MANUFACTURING METHOD OF MULTILAYER CERAMIC ELECTRONIC COMPONENT

CROSS-REFERENCE TO RELATED APPLICATION(S)

This application is the divisional application of U.S. patent application Ser. No. 16/836,085 filed on Mar. 31, 2020, which claims the benefit of priority to Korean Patent Application No. 10-2019-0094257 filed on Aug. 2, 2019 in the Korean Intellectual Property Office, the disclosure of which is incorporated herein by reference in its entirety.

TECHNICAL FIELD

The present disclosure relates to a multilayer ceramic electronic component, and more specifically to a multilayer ceramic electronic component having excellent reliability and a manufacturing method thereof.

BACKGROUND

Generally, electronic components using ceramic materials such as capacitors, inductors, piezoelectric devices, varistors, thermistors, or the like, may include a ceramic body formed of a ceramic material, internal electrodes formed inside the ceramic body, and external electrodes disposed on a surface of the ceramic body so as to be connected to the internal electrodes.

Among multilayer ceramic electronic components, a multilayer ceramic capacitor includes a plurality of laminated dielectric layers, internal electrodes disposed to oppose each other with a dielectric layer interposed therebetween, and external electrodes electrically connected to the internal electrodes.

Multilayer ceramic capacitors are widely used as components of computers, PDAs, mobile phones, and other mobile communication devices due to their small size, high capacity and ease of mounting.

Recently, in accordance with the lightening and miniaturization of electronic devices with high performance, there has been demand also for electronic components to be miniaturized and have high performance and high capacity.

In particular, a method of simultaneously achieving miniaturization, high performance and high capacity is to laminate a large number of layers by reducing thicknesses of dielectric layers and the internal electrode layers of the multilayer ceramic capacitor. Currently, the thickness of the dielectric layer has reached at about 0.6 μm, and slimming of the dielectric layers is ongoing.

In this regard, a ratio of interface contact between the internal electrode and the dielectric continuously increases; however, a region in which a metal and ceramic are bonded is vulnerable to delamination and cracking due to low adhesion therebetween.

As the delamination and cracking lead to deterioration of moisture resistance reliability of the multilayer ceramic capacitor, a new method for securing high reliability with respect to materials or structures to solve such problems.

SUMMARY

The present disclosure relates to a multilayer ceramic electronic component and a manufacturing method thereof, and more particularly to a multilayer ceramic electronic component and a manufacturing method thereof having excellent reliability.

According to an aspect of the present disclosure, a multilayer ceramic electronic component includes a ceramic body including a dielectric layer; and first and second internal electrodes disposed inside the ceramic body, and disposed to oppose each other with the dielectric layer interposed therebetween, wherein, when an average thickness of the dielectric layer is referred to as td and a standard deviation of a thickness of the dielectric layer in each position is referred to as $\sigma td$, while an average thickness of the first and second internal electrodes is referred to as te and a standard deviation of a thickness of a pre-determined region of any layer of the internal electrodes in each position is referred to as $\sigma te$, a ratio ($\sigma te/\sigma td$) of the standard deviation of the internal electrodes in each position to the standard deviation of the thickness of the dielectric layer in each position satisfies $1.10 \le \sigma te/\sigma td \le 1.35$.

According to another aspect of the present disclosure, a manufacturing method of a multilayer ceramic electronic component includes preparing a ceramic green sheet comprising ceramic powder, forming an internal electrode pattern with a conductive paste comprising a conductive metal particle and an additive on the ceramic green sheet, laminating a ceramic green sheet on which the internal electrode pattern is formed to form a ceramic laminate and plasticizing the ceramic laminate to form a ceramic body comprising a dielectric layer and an internal electrode, wherein, when an average thickness of the dielectric layer is referred to as td and a standard deviation of a thickness of the dielectric layer in each position is referred to as $\sigma td$, while an average thickness of the first and second internal electrodes is referred to as te and a standard deviation of a thickness of a pre-determined region of any layer of the internal electrodes in each position is referred to as $\sigma te$, a ratio ($\sigma te/\sigma td$) of the standard deviation of the internal electrodes in each position to the standard deviation of the thickness of the dielectric layer in each position satisfies $1.10 \le \sigma te/\sigma td \le 1.35$.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings. The present disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

An exemplary embodiment of the present disclosure relates to a ceramic electronic component. The electronic component using the ceramic material includes a capacitor, an inductor, a piezoelectric element, a varistor, a thermistor, or the like. Hereinafter, a multilayer ceramic capacitor will be described as an example of the ceramic electronic component.

Figure 1:
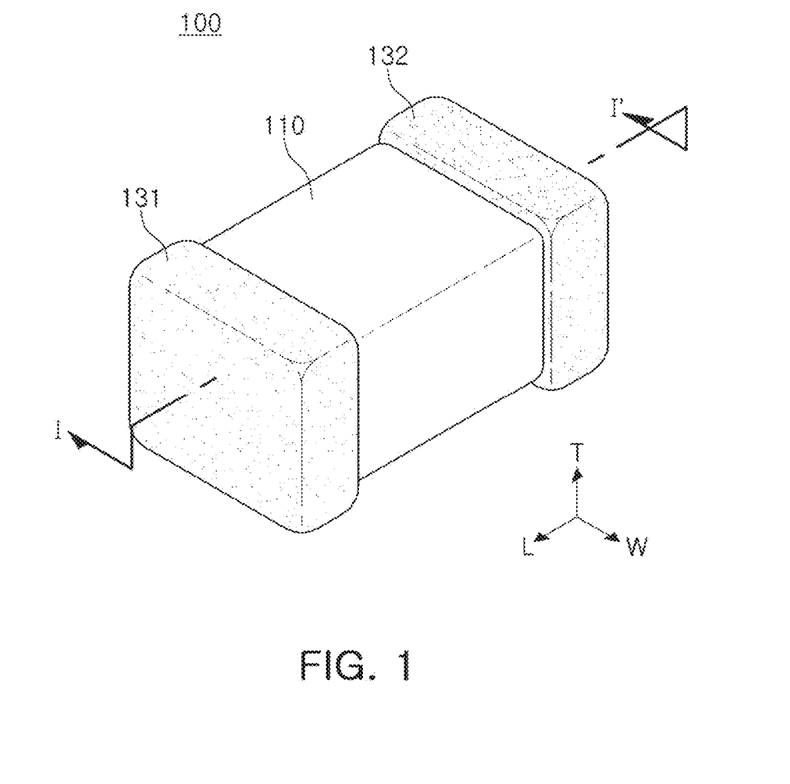
FIG. 1 is a schematic perspective view illustrating a multilayer ceramic capacitor according to an exemplary embodiment of the present disclosure.

FIG. 1 is a schematic perspective view illustrating a multilayer ceramic capacitor according to an exemplary embodiment of the present disclosure.

Figure 2:
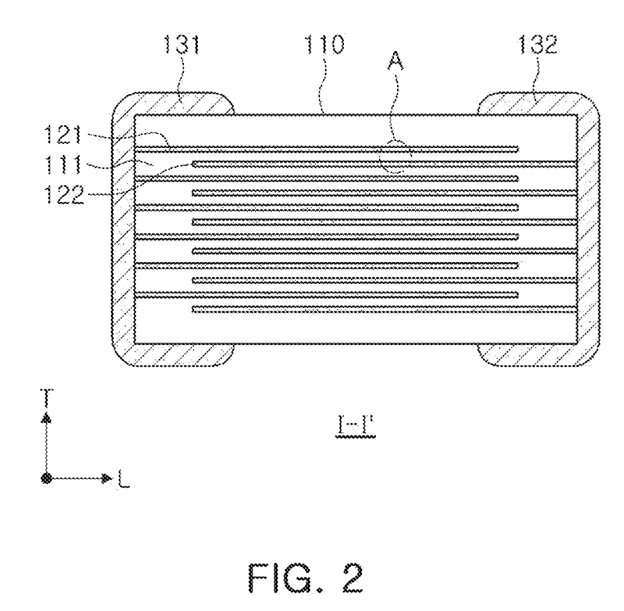
FIG. 2 is a schematic cross-sectional view illustrating a multilayer ceramic capacitor taken along line I-I' of FIG. 1.

FIG. 2 is a schematic cross-sectional view illustrating a multilayer ceramic capacitor taken along line I-I' of FIG. 1.

Figure 3:
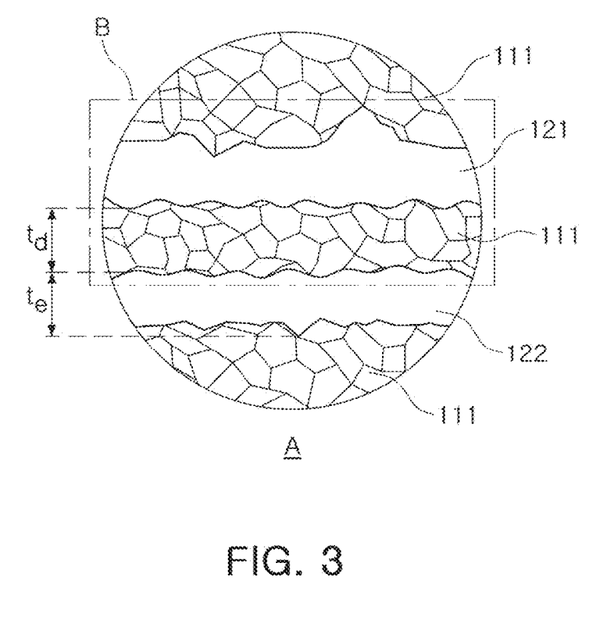
FIG. 3 is an enlarged view of region "A" of FIG. 2.

FIG. 3 is an enlarged view of region "A" of FIG. 2.

Figure 4:
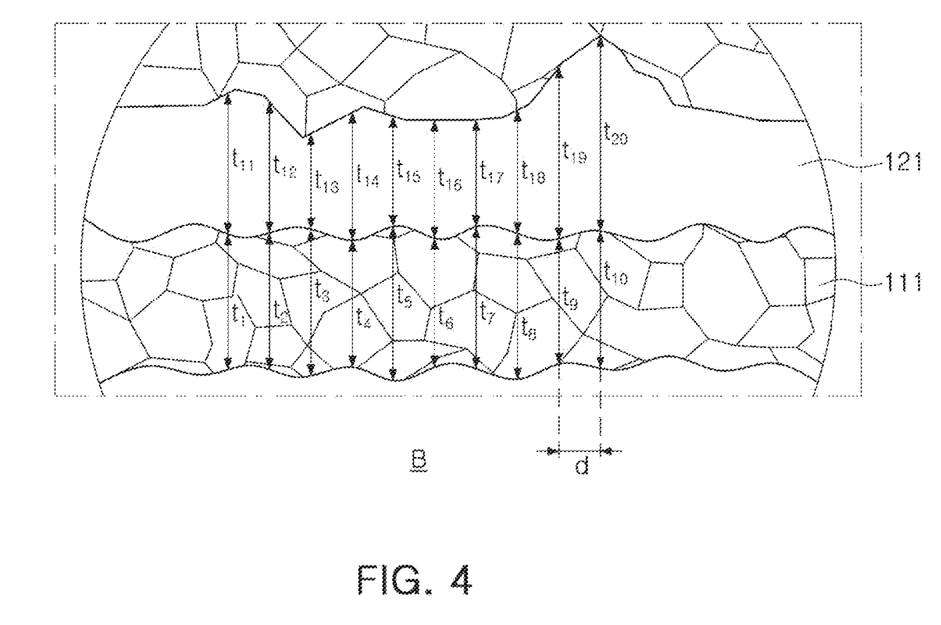
FIG. 4 is an enlarged view of region "B" of FIG. 3.

FIG. 4 is an enlarged view of region "B" of FIG. 3.

Referring to FIGS. 1 to 4, a multilayer ceramic capacitor according to an exemplary embodiment of the present disclosure may include a ceramic body 110, internal electrodes 121 and 122 formed inside the ceramic body, and external electrodes 131 and 132 formed on outside of the ceramic body 110.

In an exemplary embodiment, the "length direction," "width direction," and "thickness direction" of FIG. 1 are defined as an "L" direction, a "W" direction, and a "T" direction. The "thickness direction" may be used in the same sense as a direction in which the dielectric layers are laminated up, for example, a "lamination direction."

Although not particularly limited, the ceramic body 110 according to an exemplary embodiment may have a rectangular cuboid shape.

The ceramic body 110 may be formed by laminating a plurality of dielectric layers 111.

A plurality of the dielectric layers 111 constituting the ceramic body 110, in a sintered state, may be integrated in a single body such that boundaries between adjacent dielectric layers 111 may not be readily apparent.

The dielectric layer 111 may be formed by sintering a ceramic green sheet containing ceramic powder.

The ceramic powder is not particularly limited as long as it is conventionally used in the art.

Although not limited thereto, the ceramic powder may contain, for example, $BaTiO_3$-based ceramic powder.

The $BaTiO_3$-based ceramic powder may be $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$, or the like, in which calcium (Ca), zirconium (Zr), or the like, is included in $BaTiO_3$, but is not limited thereto.

In addition to the ceramic powder, the ceramic green sheet may contain a transition metal, a rare-earth element, magnesium (Mg), aluminum (Al), or the like.

A thickness of the dielectric layer 111 may be appropriately changed according to capacitance design of the multilayer ceramic capacitor.

For example, the thickness of the dielectric layer 111 formed between two adjacent internal electrode layers after sintering may be 0.4 μm or less, but is not limited thereto.

In an exemplary embodiment of the present disclosure, the thickness of the dielectric layer 111 may refer to an average thickness.

The average thickness of the dielectric layer 111 is an average thickness of the ceramic body 110 in a length-thickness (L-T) direction cross-section cut in a central portion in a width (W) direction thereof.

The average thickness of the dielectric layer 111 may be measured by scanning an image of the ceramic body 110 in the length direction cross-section with a scanning electron microscope (SEM), as illustrated in FIG. 2.

For example, an average value may be calculated by measuring thicknesses of any dielectric layer extracted from an SEM-scanned image of the ceramic body 110 whose length-thickness (L-T) direction cross-section is cut in a central portion in the width direction (W) at 30 positions at an equidistant interval in the length direction.

The 30 positions at an equidistant interval may be measured at a capacitance formation portion, a region in which the internal electrodes 121 and 122 overlap.

In addition, when an average value is measured for at least 10 dielectric layers, thereby increasing a measurement scale, the average thickness of the dielectric layer may be further generalized.

The internal electrodes 121 and 122 may be disposed inside the ceramic body 110.

The internal electrodes 121 and 122 may be formed and laminated on the ceramic green sheet, and may be formed inside the ceramic body 110 by sintering with one dielectric layer interposed therebetween.

The internal electrode may be a pair of first and second internal electrodes 121 and 122 having different polarities, and may be disposed to oppose each other in the lamination direction of the dielectric layer.

As illustrated in FIG. 2, ends of the first and second internal electrodes 121 and 122 may be alternately exposed to one surface of the ceramic body 110 in the longitudinal direction.

In addition, although not illustrated, the first and second internal electrodes according to an exemplary embodiment of the present disclosure may have lead portions, and may be exposed to the same surface of the ceramic body through the lead portions. Alternately, the first and second internal electrodes may have lead portions, and may be exposed to one or more surfaces of the ceramic body through the lead portions.

Although not particularly limited, a thickness of the first and second internal electrodes 121 and 122 may be, for example, 0.41 μm or less.

According to an exemplary embodiment of the present disclosure, 200 or more dielectric layers on which the internal electrodes are formed may be laminated.

According to an exemplary embodiment, when the thickness of the first and second internal electrodes 121 and 122 is 0.41 μm or less, moisture resistance reliability may be improved. Even in the case of thin film internal electrodes, a featured constitution, excellent withstand voltage, may be achieved. When the thickness of the first and second internal electrodes 121 and 122 exceeds 0.41 μm, withstand voltage or deteriorations of reliability may not occur even when the featured constitution of the present disclosure is not applied.

In other words, the following featured constitution of the present disclosure may be applied to improve reliability when the thickness of the first and second internal electrodes 121 and 122 is 0.41 μm or less.

The average thickness of the first and second internal electrodes 121 and 122 is an average thickness in the length-thickness (L-T) direction cross-section of the ceramic body 110 cut in a central portion in the width direction (W).

According to an exemplary embodiment, external electrodes 131 and 132 may be formed on an exterior of the ceramic body 110 and may be electrically connected to the internal electrodes 121 and 122.

More specifically, the external electrodes 131 and 132 may be configured to have the first external electrode 131 electrically connected to the first internal electrode 121 exposed to one surface of the ceramic body 110 and the second external electrode 132 electrically connected to the second internal electrode 122 exposed to the other surface of the ceramic body 110.

In addition, a plurality of the external electrodes may be formed to be connected to the first and second internal electrodes exposed to the ceramic body.

The external electrodes 131 and 132 may be formed of a conductive paste containing metal powder.

The metal powder contained in the conductive paste is not particularly limited, and may be, for example, nickel (Ni), copper (Cu) or alloys thereof.

A thickness of the external electrodes 131 and 132 may be appropriately determined depending on a purpose, or the like, and may be, for example, about 10 µm to 50 µm.

Referring to FIGS. 3 and 4, with respect to a multilayer ceramic electronic component according to an exemplary embodiment, when an average thickness of the dielectric layer is referred to as td and a standard deviation of a thickness of the dielectric layer in each position is referred to as σtd, while an average thickness of the first and second internal electrodes is referred to as te and a standard deviation of a thickness of a pre-determined region of any layer of the internal electrodes in each position is referred to as σte, a ratio (σte/σtd) of the standard deviation of the internal electrodes in each position to the standard deviation of the thickness of the dielectric layer in each position satisfies 1.10≤σte/σtd≤1.35.

In recent years, most cases of the moisture resistance deteriorations of reliability in highly laminated multilayer ceramic capacitors with high capacity are mainly caused by delamination and cracking due to weakening of the adhesion between the metal and the ceramic at an interface between the internal electrode and the dielectric.

In order to solve the problem of moisture resistance deteriorations of reliability of the multilayer ceramic capacitor, it is necessary to increase an interfacial adhesion between the internal electrode and the dielectric. If a surface area of an interfacial bonding area increases, the deterioration of moisture resistance may be resolved.

In addition, the surface area of the interfacial bonding area between the internal electrode and the dielectric may be increased by finely adjusting roughness of the internal electrode.

However, excessive adjustment of a roughness profile of the internal electrode may give rise to a side effect of reduced withstand voltage characteristics of the multilayer ceramic capacitor. Accordingly, it is necessary to appropriately adjust the roughness of the internal electrode to improve the withstand voltage in addition to the moisture resistance reliability.

According to an exemplary embodiment of the present disclosure, moisture resistance reliability can be improved through increased mechanical strength of chip by adjusting the ratio (σte/σtd) of the standard deviation of the internal electrodes 121 and 122 in each position to the standard deviation of the thickness of the dielectric layer 111 in each position to satisfy 1.10≤σte/σtd≤1.35, and this will allow a multilayer ceramic electronic component having excellent withstand voltage to be achieved.

When the ratio (σte/σtd) of the standard deviation of the internal electrodes 121 and 122 in each position to the standard deviation of the thickness of the dielectric layer 111 in each position is less than 1.10, the withstand voltage characteristics may be excellent, but moisture resistance reliability may deteriorate in consequence of reduced mechanical strength of the chip.

Meanwhile, when the ratio (σte/σtd) of the standard deviation of the internal electrodes 121 and 122 in each position to the standard deviation of the thickness of the dielectric layer 111 in each position is greater than 1.35, the mechanical strength of the chip is high and the moisture resistance reliability is not problematic, but the withstand voltage characteristics may be lowered, thereby making the reliability an issue.

The standard deviation of thickness of the dielectric layer in each position is measured in a region of 20 µm×14 µm of a single dielectric layer 111 in the L-T cross-section of the ceramic body, and is a standard deviation of a thickness of each dielectric layer in at least 10 positions at an interval of 10 nm or less.

Additionally, the standard deviation of thickness of the first and second internal electrodes in each position is measured in a region of 20 µm×14 µm of one internal electrode in the L-T cross-section of the ceramic body, and may be a standard deviation of a thickness of each internal electrode in at least 10 positions at an interval of 10 nm or less.

Specifically, the standard deviation (σtd) of the standard deviation of the dielectric layer 111 in each position and the standard deviation (σte) of the internal electrodes 121 and 122 in each position may be measured by scanning an image of a length direction cross section of the ceramic body 110 using an SEM as illustrated in FIG. 2.

For example, an average value may be calculated by measuring thicknesses $t_1$ to $t_{10}$ of one dielectric layer 111 and $t_{11}$ to $t_{20}$ of one internal electrode 121 extracted from the SEM-scanned image of the L-T direction cross-section of the ceramic body 110 cut in a central portion in the width direction (W) as shown in FIG. 2 at 10 positions at an equidistant interval in the length direction as shown in FIGS. 3 and 4.

The equidistant interval is a distance (d) of 10 nm or less, and allows measurements of the thicknesses ($t_1$ to $t_{10}$) at 10 positions of one dielectric layer 111 and that ($t_1$ to $t_{10}$) at 10 positions of one internal electrode 121.

The 10 positions of the one dielectric layer 111 and one internal electrode 121 whose thicknesses are measured may be determined in a capacitance-forming portion, a region in which the internal electrodes 121 and 122 overlap.

In an exemplary embodiment, the thicknesses ($t_1$ to $t_{10}$) were measured at 10 positions of one dielectric layer 111 at the equidistant interval (d), but may be measured in at least 10 positions on the dielectric layer at the equidistant interval of 10 nm or less, but are not limited thereto.

Further, the thicknesses ($t_{11}$ to $t_{20}$) were measured at 10 positions of one internal electrode 121 at the equidistant interval (d), but may be measured in at least 10 positions on the internal electrode at the equidistant interval of 10 nm or less, but are not limited thereto.

In order to calculate the standard deviation (σtd) of the thickness of the one dielectric layer 111 in each position, a value calculated by subtracting an average thickness (td) of the dielectric layer 111 from each thickness of the $t_1$ to $t_{10}$ of the one dielectric layer 111 is squared. Resulting values calculated for all the $t_1$ to $t_{10}$ are averaged to calculate variance.

In order to calculate the standard deviation (σte) of the thickness of the one internal electrode 121 in each position, a value calculated by subtracting an average thickness (te) of the internal electrode 121 from each thickness of the $t_{11}$ to $t_{20}$ of the one internal electrode 121 is squared. Resulting values calculated for all the $t_{11}$ to $t_{20}$ are averaged to calculate variance.

The square root of each variance is then taken to calculate the standard deviation (σtd) of the thicknesses $t_1$ to $t_{10}$ of the one dielectric layer 111 measured at the 10 positions and the standard deviation (σte) of the thicknesses $t_{11}$ to $t_{20}$ of the one internal electrode 121 measured at the 10 positions.

The standard deviation (σtd) of the thicknesses $t_1$ to $t_{10}$ of the one dielectric layer 111 in each position and the standard deviations (σte) of the thicknesses $t_{11}$ to $t_{20}$ of the internal electrodes 121 and 122 in each position are an index indicating differences in the thicknesses of the dielectric layer and the internal electrodes in each position and the average thickness thereof, and are different from Ra, average roughness at a center line.

That is, Ra, which is the average roughness of a center line, is a value obtained by dividing the sum of areas of different parts by a surface roughness based on a virtual center line in an actual shape of one interface of the internal electrode by a predetermined length, and it has a definition different from the standard deviation of thickness of each position of the internal electrode according to an exemplary embodiment of the present disclosure, and there is a difference in the measured values.

According to an exemplary embodiment, deterioration of moisture resistance reliability can be prevented and withstand voltage characteristics can be improved by appropriately adjusting the standard deviations of the thicknesses of the dielectric layer and the internal electrodes in each position.

That is, by finely adjusting the roughness of the internal electrodes, the interfacial bonding area between the internal electrodes and the dielectric may be increased. In addition, the withstand voltage characteristics of the multilayer ceramic capacitor may be increased by not excessively increasing the roughness of the internal electrode.

A multilayer ceramic capacitor 100 according to an exemplary embodiment is a subminiaturized product with high capacity, and has the dielectric layer 111 having a thickness of 0.4 μm or less and the first and second internal electrodes 121 and 122 of 0.41 μm or less, but is not necessarily limited thereto.

In other words, as the multilayer ceramic capacitor 100 according to an exemplary embodiment is subminiaturized and has high capacity, the dielectric layers 111 and the first and second internal electrodes 121 and 122 are formed to be thin films compared to those of conventional products. Products to which such thin film dielectric layers and internal electrodes are applied have an issue of deteriorations of reliability due to shrinkage of the internal electrodes in the thickness direction during the sintering.

That is, conventional multilayer ceramic capacitors have a relatively thicker dielectric layer and internal electrodes compared to those of the multilayer ceramic capacitor according to an exemplary embodiment of the present disclosure. Accordingly, deteriorations of reliability caused by the shrinkage in the thickness direction occurring during the sintering of the internal electrodes have not been a critical issue.

However, for a product to which thin film dielectric layers and internal electrodes are applied as in an exemplary embodiment of the present disclosure, it is necessary to control the interfacial adhesion between the internal electrodes and the dielectric layers in order to improve reliability.

To increase the interfacial adhesion between the internal electrodes and the dielectric layers, a method of increasing the interfacial bonding area between the internal electrode and the dielectric is demanding. A bonding area may be increased by finely adjusting the roughness of the internal electrode.

However, when a roughness profile of the dielectric layers and the internal electrodes is excessively adjusted, a side effect of reduced withstand voltage characteristics of the multilayer ceramic capacitor may occur. Therefore, it is necessary to appropriately adjust the roughness of the dielectric layers and the internal electrodes so as to improve the withstand voltage in addition to moisture resistance reliability.

Accordingly, it is necessary to appropriately adjust the roughness of the internal electrodes in a product to which thin film dielectric layer and the internal electrodes are applied, where the dielectric layer 111 has a thickness of 0.4 μm or less and the first and second internal electrodes 121 and 122 have a thickness of 0.41 μm or less after plasticizing.

That is, in an exemplary embodiment, by adjusting the ratio (σte/σtd) of the standard deviation of the internal electrodes 121 and 122 in each position to the standard deviation of the thickness of the dielectric layer 111 in each position to satisfy $1.10 \leq \sigma te/\sigma td \leq 1.35$, a multilayer ceramic electronic components having excellent withstand voltage characteristics and improved moisture resistance reliability through increasing the mechanical strength of the chip even when the thicknesses of the dielectric layers 111 and the internal electrodes 121 and 122 after plasticizing are 0.4 μm or less and 0.41 μm or less, respectively, can be accomplished.

However, the expression "thin film" does not mean that the thicknesses of the dielectric layers 111 and the first and second internal electrodes 121 and 122 are 0.4 μm or less and 0.41 μm or less, respectively, but may be understood as being thinner than those of conventional products.

Hereinafter, a method of manufacturing a multilayer ceramic capacitor for accomplishing the feature of the present disclosure will be described in more detail.

A method of manufacturing a multilayer ceramic electronic component according to an exemplary embodiment involves preparing a ceramic green sheet comprising ceramic powder, forming an internal electrode pattern with a conductive paste comprising a conductive metal particle and an additive on the ceramic green sheet, laminating a ceramic green sheet on which the internal electrode pattern is formed to form a ceramic laminate, and plasticizing the ceramic laminate to form a ceramic body comprising a dielectric layer and an internal electrode. A ratio (σte/σtd) of the standard deviation of the internal electrodes in each position to the standard deviation of the thickness of the dielectric layer in each position satisfies $1.10 \leq \sigma te/\sigma td \leq 1.35$.

According to an exemplary embodiment, a plurality of ceramic green sheets may be provided.

The ceramic green sheet may be prepared in the form of a sheet having a thickness of several micrometers by mixing ceramic powder, a binder, a solvent, and the like, to prepare slurry and allowing the slurry to be subject to a doctor blade method. The ceramic green sheet may then be sintered to be formed as a single dielectric layer 111 as illustrated in FIG. 2.

The thickness of the ceramic green sheet may be 0.6 μm or less, and thus, the thickness of the dielectric layer after plasticizing may be 0.4 μm or less.

An internal electrode pattern may be formed by applying a conductive paste for internal electrodes on the ceramic green sheet. The internal electrode pattern may be formed by a screen-printing method or a gravure printing method.

The conductive paste for internal electrodes may include a conductive metal and an additive, and the additive may be at least one of non-metal and metal oxides.

The conductive metal may include nickel. The additive may include barium titanate or strontium titanate as the metal oxide.

A thickness of the internal electrode pattern may be 0.5 µm or less. In this regard, the thickness of the internal electrode after plasticizing may be 0.41 µm or less.

The ceramic green sheets on which the internal electrode pattern is formed may then be laminated, pressed from the lamination direction, and compressed. Accordingly, a ceramic laminate on which an internal electrode pattern is formed may be prepared.

The ceramic laminate may be cut and chipped for each region corresponding to one capacitor.

In this case, the ceramic laminate may be cut so that one ends of the internal electrode patterns are alternately exposed through a side surface thereof.

The chipped laminate may then be plasticized to prepare a ceramic body including a dielectric layer and internal electrodes.

The plasticization may be carried out in a reducing atmosphere. In addition, the plasticization may be carried out by adjusting a temperature increase rate. Although not limited, the temperature increase rate may be 30° C./60 s to 50° C./60 s at 700° C. or below.

According to an exemplary embodiment, a multilayer ceramic electronic component can be achieved to have improved water resistance reliability through increased chip strength and have excellent withstand voltage resistance characteristics by adjusting the ratio ($\sigma te/\sigma td$) of the standard deviation of the internal electrodes 121 and 122 in each position to the standard deviation of the thickness of the dielectric layer 111 in each position to satisfy $1.10 \leq \sigma te/\sigma td \leq 1.35$.

External electrodes may be formed to cover a side surface of the ceramic body and be electrically connected to the internal electrodes exposed to the side surface of the ceramic body. A plating layer of a metal such as nickel, tin, or the like, may be formed on a surface of the external electrode.

Hereinbelow, the present disclosure will be described in detail with reference to Examples and Comparative Examples.

Multilayer ceramic capacitors according to the Examples and Comparative Examples were prepared according to the following methods.

Barium titanate powder, ethanol as an organic solvent, and polyvinyl butyral as a binder were mixed, ball milled to prepare ceramic slurry. The ceramic slurry was used to prepare a ceramic green sheet.

The conductive paste for internal electrodes containing nickel was printed on the ceramic green sheet to form internal electrodes, and a green laminate, thus laminated, was subjected to isostatic pressing at a pressure of 1,000 kgf/cm$^2$ at 85° C.

After cutting the compressed green laminate to prepare a green chip, the cut green chip was subjected to a debinding process at 230° C. for 60 hours under an air atmosphere and was sintered at 1000° C. to prepare a sintered chip. The sintering was carried out under a reducing atmosphere to prevent the internal electrodes from being oxidized, while setting the reducing atmosphere to $10^{-11}$ to $10^{-10}$ atm, which is lower than Ni/NiO equilibrium oxygen partial pressure.

A paste for external electrodes containing copper powder and glass powder on an outside of the sintered chip was used to form the external electrodes, and a nickel-plating layer and a tin-plating layer were formed on the external electrodes by electroplating.

According to the above method, a multilayer ceramic capacitor having a size of 0603 was prepared. The 0603 size may be 0.6 µm±0.1 µm and 0.3 µm±0.1 µm in length and width, respectively. The characteristics of the multilayer ceramic capacitor were evaluated as follows.

Table 1 shows a comparison of electrode connectivity according to an average number of conductive metal particles in the thickness direction of the internal electrode pattern and determination results thereof, according to an exemplary embodiment of the present disclosure.

TABLE 1

| | Ratio of standard deviation of thickness of internal electrodes in each position to standard deviation of thickness of dielectric layer ($\sigma te/\sigma td$) | Chip Strength (%) | Judge reliability (No. of defects/No. of samples) | Withstand voltage characteristics (comparison) |
|---|---|---|---|---|
| 1* | Less than 1.10 | 70 | 4/400 | ⊚ |
| 2 | 1.10~1.20 | 80 | 0/400 | ○ |
| 3 | 1.25~1.35 | 85 | 0/400 | ○ |
| 4* | 1.40 | 90 | 0/400 | X |

[Evaluation]
X: Bad,
○: Good,
⊚: Very good
*Comparative Example

Referring to Table 1, Sample 1 is a case in which the ratio ($\sigma te/\sigma td$) of the standard deviation of the internal electrodes 121 and 122 in each position to the standard deviation of the thickness of the dielectric layer 111 in each position is less than 1.10, indicating that the withstand voltage characteristics are excellent but moisture resistance reliability may be deteriorated due to lowered chip mechanical strength.

Meanwhile, Sample 4 is a case in which the ratio ($\sigma te/\sigma td$) of the standard deviation of the internal electrodes 121 and 122 in each position to the standard deviation of the thickness of the dielectric layer 111 in each position is 1.40, which exceeds 1.35. In this case, the moisture resistance reliability may not be problematic, but the withstand voltage characteristics may deteriorate, thereby rising a reliability issue.

On the other hand, Samples 2 and 3 are cases in which the numerical range of the present disclosure is satisfied. This indicates that by adjusting the ratio ($\sigma te/\sigma td$) of the standard deviation of the internal electrodes 121 and 122 in each position to the standard deviation of the thickness of the dielectric layer 111 in each position to satisfy $1.10 \leq \sigma te/$ $\sigma td \leq 1.35$, a multilayer ceramic electronic component can be achieved to have improved water resistance reliability through increased chip strength and have excellent withstand voltage resistance characteristics.

According to an exemplary embodiment of the present disclosure, moisture resistance reliability can be improved through increasing mechanical strength of the chip body, and the multilayer ceramic electronic component having excellent withstand voltage characteristics may be implemented by controlling the ratio ($\sigma te/\sigma td$) of the standard deviation of thickness of the internal electrode in each position to the standard deviation of the thickness of the dielectric layer in each position.

While exemplary embodiments have been shown and described above, it will be apparent to those skilled in the art that modifications and variations could be made without departing from the scope of the present invention as defined by the appended claims.

What is claimed is:

1. A method of manufacturing a multilayer ceramic electronic component, comprising steps of:
    preparing a ceramic green sheet comprising ceramic powder;
    forming an internal electrode pattern with a conductive paste comprising conductive metal particles and an additive on the ceramic green sheet;
    laminating a ceramic green sheet on which the internal electrode pattern is formed to form a ceramic laminate; and
    plasticizing the ceramic laminate to form a ceramic body comprising a dielectric layer and an internal electrode,
    wherein, when an average thickness of the dielectric layer is referred to as td and a standard deviation of a thickness of the dielectric layer in each position is referred to as $\sigma td$, while an average thickness of the internal electrode is referred to as te and a standard deviation of a thickness of a pre-determined region of any layer of the internal electrode in each position is referred to as $\sigma te$, a ratio ($\sigma te/\sigma td$) of the standard deviation of the internal electrode in each position to the standard deviation of the thickness of the dielectric layer in each position satisfies $1.10 \leq \sigma te/\sigma td \leq 1.35$.

2. The method of manufacturing the multilayer ceramic electronic component of claim 1, wherein the average thickness of the dielectric layer and the internal electrode is an average thickness of the ceramic body in a length-thickness (L-T) direction cross-section cut in a central portion in a width (W) direction.

3. The method of manufacturing the multilayer ceramic electronic component of claim 1, wherein the average thickness of the internal electrode is 0.41 μm or less.

4. The method of manufacturing the multilayer ceramic electronic component of claim 1, wherein the average thickness of the dielectric layer is 0.4 μm or less.

5. The method of manufacturing the multilayer ceramic electronic component of claim 1, wherein the standard deviation of thickness of the internal electrode in each position is measured in a region of 20 μm×14 μm of one internal electrode in a length-thickness direction (L-T) cross-section of the ceramic body, and is a standard deviation of a thickness of the internal electrode in at least 10 positions at an interval of 10 nm or less.

6. The method of manufacturing the multilayer ceramic electronic component of claim 1, wherein the standard deviation of thickness of the dielectric layer in each position is measured in a region of 20 μm×14 μm of one dielectric layer in a length-thickness direction (L-T) cross-section of the ceramic body, and is a standard deviation of a thickness of the dielectric layer in at least 10 positions at an interval of 10 nm or less.

7. The method of manufacturing the multilayer ceramic electronic component of claim 1, wherein the ceramic body comprises at least 200 dielectric layers with corresponding internal electrodes.

8. The method of manufacturing the multilayer ceramic electronic component of claim 1, wherein the average thickness of the internal electrode is 0.41 μm or less and the average thickness of the dielectric layer is 0.4 μm or less.

* * * * *